United States Patent
Kim et al.

(10) Patent No.: US 7,778,528 B2
(45) Date of Patent: *Aug. 17, 2010

(54) METHOD OF REPRODUCING AN INTERACTIVE DISK THROUGH A NETWORK

(75) Inventors: Tae Ho Kim, Seoul (KR); Jea Yong Yoo, Seoul (KR); Alexandre Limonov, Seoul (KR)

(73) Assignee: LG Electronics Inc., Seoul (KR)

( * ) Notice: Subject to any disclaimer, the term of this patent is extended or adjusted under 35 U.S.C. 154(b) by 1366 days.

This patent is subject to a terminal disclaimer.

(21) Appl. No.: 10/282,878

(22) Filed: Oct. 29, 2002

(65) Prior Publication Data

US 2003/0081944 A1 May 1, 2003

(30) Foreign Application Priority Data

Oct. 30, 2001 (KR) ............................... 2001-67254

(51) Int. Cl.
*H04N 5/00* (2006.01)
*H04N 9/79* (2006.01)
*H04N 5/91* (2006.01)
*H04N 7/00* (2006.01)
*G11B 21/08* (2006.01)
*G11B 7/085* (2006.01)

(52) U.S. Cl. ...................... 386/125; 386/126; 386/45; 386/95; 386/105; 386/106; 369/30.03; 369/30.04; 369/30.07; 369/30.08; 369/30.09

(58) Field of Classification Search ......... 386/125–126, 386/45, 94–95, 105–106
See application file for complete search history.

(56) References Cited

U.S. PATENT DOCUMENTS

| | | | |
|---|---|---|---|
| 5,790,937 A | 8/1998 | Gutle | |
| 6,154,773 A | 11/2000 | Roberts et al. | |
| 7,181,458 B1 | 2/2007 | Higashi | |
| 7,281,220 B1 * | 10/2007 | Rashkovskiy | 715/838 |
| 2002/0049981 A1 | 4/2002 | Tzou | |
| 2002/0069132 A1 * | 6/2002 | Perkes et al. | 705/26 |
| 2002/0078144 A1 * | 6/2002 | Lamkin et al. | 709/203 |
| 2002/0129375 A1 * | 9/2002 | Kim et al. | 725/100 |
| 2003/0152366 A1 * | 8/2003 | Kanazawa et al. | 386/69 |

FOREIGN PATENT DOCUMENTS

| | | |
|---|---|---|
| DE | 199 40 789 A1 | 8/1999 |
| DE | 199 40 789 A1 | 3/2001 |
| EP | 0 886 276 A3 | 2/2000 |

(Continued)

*Primary Examiner*—Thai Tran
*Assistant Examiner*—Daquan Zhao
(74) *Attorney, Agent, or Firm*—Birch, Stewart, Kolasch & Birch, LLP

(57) ABSTRACT

The present invention relates to an interactive disk reproducing method using a network. The present method downloads various content-related information and the latest contents associated with A/V data pre-recorded on a placed interactive disk from a remote content-providing server connected through a network before reproduction of the placed interactive disk, and makes presentation of video or audio reproduced from the interactive disk along with contents already-received from the server while synchronizing presentation time of the A/V data and the contents with reference to the downloaded content-related information.

12 Claims, 3 Drawing Sheets

FOREIGN PATENT DOCUMENTS

| | | |
|---|---|---|
| JP | 11-018048 | 1/1999 |
| JP | 11-065409 | 3/1999 |
| JP | 11-098467 | 4/1999 |
| JP | 11-144322 | 5/1999 |
| JP | 11-161663 A | 6/1999 |
| JP | 11-230762 | 8/1999 |
| JP | 11-232083 | 8/1999 |
| JP | 2000-030073 | 1/2000 |
| JP | 2000-148134 | 5/2000 |
| JP | 2000-253364 | 9/2000 |
| JP | 2001-250337 | 9/2001 |
| JP | 2001-275087 | 10/2001 |
| JP | 2003-216535 | 7/2003 |
| JP | 2003-219344 | 7/2003 |
| KR | 10-2000-0030073 | 6/2000 |

\* cited by examiner

METHOD OF REPRODUCING AN INTERACTIVE DISK THROUGH A NETWORK

BACKGROUND OF THE INVENTION

1. Field of the Invention

The present invention relates to a method of reproducing an interactive disk, more particularly, to a method of reproducing an A/V data written on an interactive disk such as an I-DVD (Interactive Digital Versatile Disk) while making synchronous presentation of the A/V data of an interactive disk along with additional contents provided through a network from a server located on the network.

2. Description of the Related Art

In these days, a high-density optical disk, e.g., a DVD is being widely used because it has very large storage capacity for digital data. The storage capacity of a DVD is large enough to record high-quality motion picture data of relatively long time as well as high-quality audio data.

A DVD has two recording areas, one for actual data, namely, digital data stream of motion picture data and the other for navigation data used for reproduction control of the recorded actual data.

When a DVD is placed into a DVD player, its navigation data is read into a memory first, and then motion picture data is reproduced with reference to the read navigation data. As a result, a user can view a long-time cinema recorded in high quality on a DVD with a DVD player.

Lately, an interactive DVD (called 'I-DVD') has been proposed. An I-DVD includes additional reproduction control information of recorded A/V data in form of, e.g., 'html' (Hyper-Text Markup Language) file. The reproduction control information enables an interactive reproduction of A/V data. More concrete standard for an I-DVD is being under discussion among related companies. If an I-DVD is commercialized in the near future, a supply of multi-media contents through a digital recording medium will be popularized much more.

However, according to the provisional standard of an I-DVD under discussion, because information related with reproduction of A/V data recorded on an I-DVD is provided as written thereon, newer various additional contents or newer presentation form that is related with the recorded A/V data can not be viewed or used. In order to popularize an I-DVD, it is necessary to prepare a method being able to provide newer contents or information associated with recorded A/V data than those pre-written on an I-DVD along with A/V contents.

SUMMARY OF THE INVENTION

It is an object of the present invention to provide a method that receives various content-related information associated with A/V data pre-written on a disk recording medium such as an I-DVD from a remote server through a network, and presents the A/V data written on the medium synchronously along with additional contents using the received content-related information.

A method of reproducing an interactive disk using a network in accordance with the present invention checks whether a disk placed in a disk device is an interactive disk, receives, from a server through a network, a file with contents of the latest version and at least one file related with the contents that are compatible with a version of the placed interactive disk, if the inserted disk is interactive, and makes presentation of video or audio read from the interactive disk along with data of the received contents while synchronizing presentation time each other with reference to information of the received content-related file.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, a preferred embodiment thereof will now be described with reference to the accompanying drawings.

Figure 1:
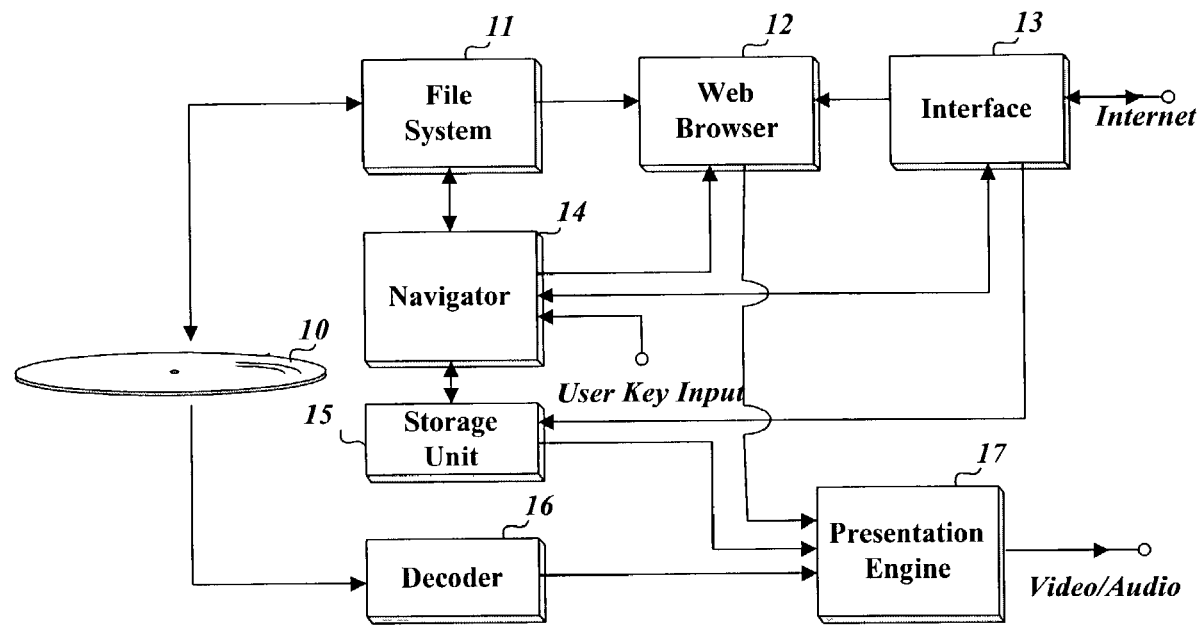
FIG. 1 is a block diagram of a disk device in which a method of reproducing an interactive disk through a network is embedded.

FIG. 1 is a block diagram of a disk device in which a method of reproducing an interactive disk through a network is embedded. The disk device of FIG. 1 comprises a decoder 16 decoding digital data read from a disk 10, e.g., an I-DVD to A/V data; a presentation engine 17 processing the decoded A/V data to output a video and/or an audio signal; a file system 11 conducting file management including searching and reading recorded files, e.g., a disk information file, a setup file, and a sync data file, etc. on the I-DVD 10; a web browser 12, with a web surfing function, being able to set up presentation environment for reproduction of an I-DVD; an interface 13 for connection to Internet; a navigator 14, a controller in a broad sense, to conduct an overall and appropriate control for all elements in response to a user's request; and a storage unit 15, e.g., a flash memory for storing a variety of files and all or a part of contents downloaded through Internet or read from the I-DVD 10.

The navigator 14, the file system 11, and the web browser 12 are all logical units, namely programs to conduct individual corresponding function and operation, and they can be all implemented in a single integrated chip.

Figure 2:
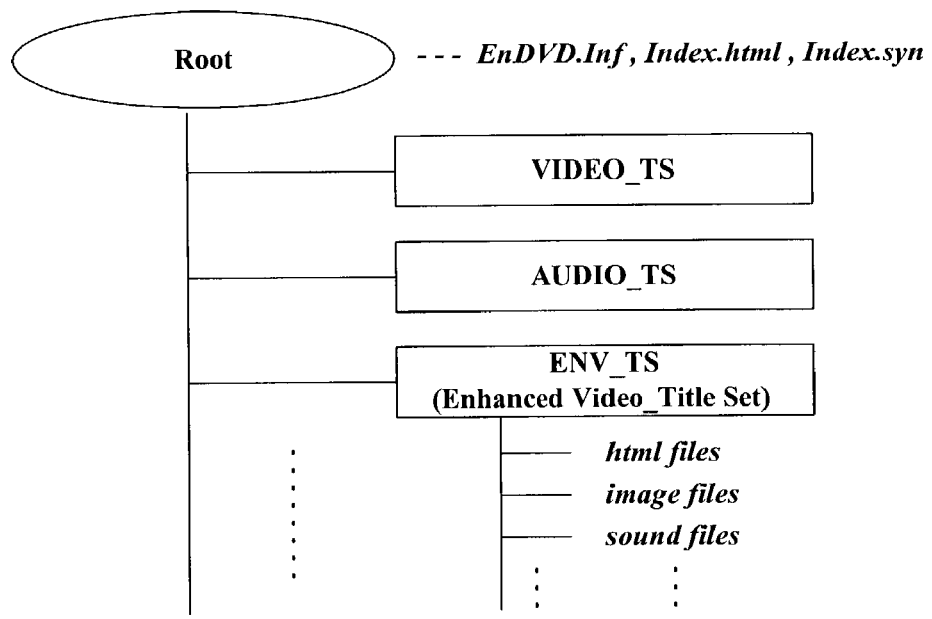
FIG. 2 shows an illustrative directory scheme of an interactive DVD structured in accordance with the present invention.

FIG. 2 shows an illustrative directory scheme of the I-DVD 10 structured in accordance with the present invention. As illustrated in FIG. 2, three files are under a root directory, the first file 'EnDVD.Inf' having requisite information for reproduction of A/V data written on an I-DVD, the second 'Index.html' for an initial setup for reproduction, and the third 'Index.syn' having time information for synchronizing between different-attribute data. Under the root directory, three subdirectories exist too, the first directory 'VIDEO_TS' including files of video data, the second 'AUDIO_TS' including files of audio data, and the third 'ENV_TS' including additional content files e.g., 'html' files, image files, and sound files to enable additional video/audio functions.

The file 'EnDVD.Inf' under the root directory has information about a disk version, a content version, a content manufacturer, and an address, e.g., URL (Universal Resource Locator) of a content providing server (abbreviated 'CP server' hereinafter) that provides a variety of contents and content-related information associated with A/V data on an I-DVD.

The setup file 'Index.html' under the root directory has environment setup information for the web browser 12 and reproduction of the I-DVD 10, and the file 'Index.syn' includes time stamp data to synchronize video/audio data, which are read from the I-DVD 10, and contents, e.g., html pages each other.

The directory 'ENV_TS' includes the contents to be presented or outputted in synchronization with A/V data written on the I-DVD. The contents are composed of html-formatted files, image files, sound files, and so on as aforementioned.

When the I-DVD 10 is placed into the disk device of FIG. 1, the file 'EnDVD.Inf' under the root directory is read first and the type of an inserted disk is determined to 'interactive' based on presence of the file 'EnDVD.Inf'. Next, a disk version is checked and the file 'Index.html' is loaded to setup environment of system and the browser for reproduction of the I-DVD. If necessary, the URL information is read from the file 'EnDVD.Inf'.

Afterwards, a connection is made through Internet to a CP server addressed by the read URL information, and the disk device receives a setup file and a sync file of the latest version compatible with the I-DVD of the checked present version through negotiation with the CP server and it does system settings again according to information included in the received files. The disk device also receives a content file of the latest version associated with version of the I-DVD, and stores it in the storage unit 15.

After settings are done, the disk device reproduces A/V data written on the I-DVD and presents A/V data and corresponding part of contents of the latest version having been provided from the CP server while synchronizing the contents with the A/V data with reference to time information contained in the received sync file. These operations are explained below in more detail.

Figure 3:
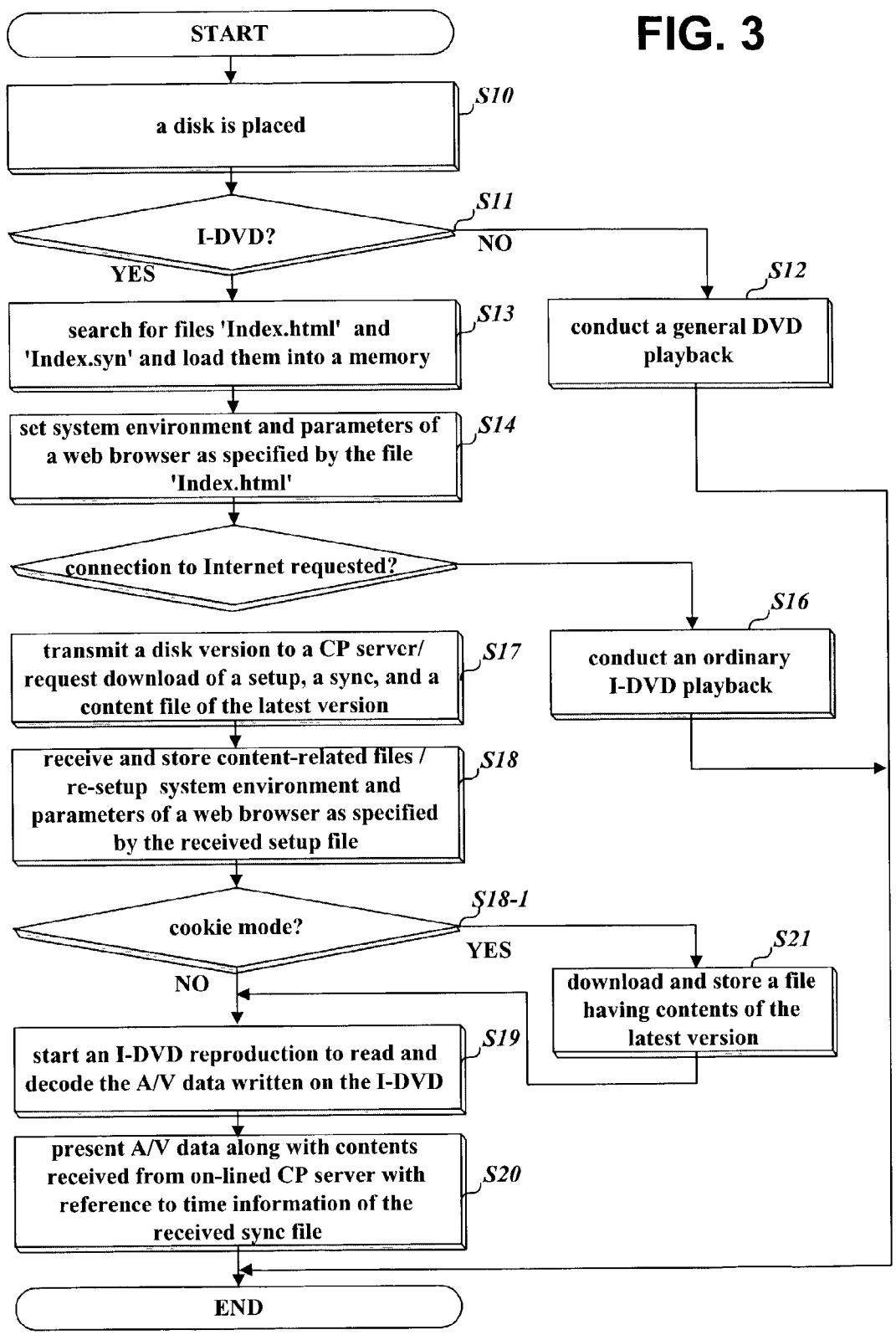
FIG. 3 is a flow diagram of an embodiment of an interactive disk reproducing method using a network of the present invention.

FIG. 3 is a flow diagram of an embodiment of an interactive disk reproducing method using a network of the present invention. The procedure depicted in FIG. 3 is conducted by the disk device of FIG. 1 as follows.

If a placed disk is a conventional DVD, the navigator 14 conducts an ordinary DVD reproducing operation in response to a user's request (S12). If an I-DVD, the navigator 14 controls the file system 11 to load the files 'Index.html' and 'Index.syn' under the root directory into the storage unit 15 (S13).

The navigator 14 interprets the file 'Index.html' in the storage unit 15 with assistance of the web browser 12, and sets up, as interpreted, a system environment and parameters of the web browser 12 (S14) that has an Internet surfing function and specifies presentation form of A/V data. At this time, user's inputs are received if needed.

After completion of setting, the navigator 14 checks whether there is an Internet-connection request from a user (S15). If there is no request, a ROM-based reproduction is conducted under condition of the present settings (S16). In the ROM-based reproduction, the contents included under the directory 'ENV_TS' of the I-DVD 10 are synchronously presented with the A/V data of the I-DVD 10 with reference to time information written in the sync file 'Index.syn'.

If a connection to Internet is requested from a user (S15), which means that download of contents of newer version than those on the I-DVD 10 is asked, the navigator 14 reads an URL written in the file 'EnDVD.Inf' under the root directory, and controls the web browser 12 and the interface 13 to make a connection to the CP server addressed by the read URL.

If a connection is made, a disk version written in the file 'EnDVD.Inf' is transmitted to the CP server along with a download request for a setup and a sync file related with the latest contents compatible with the disk version (S17). The CP server searches its db for the files 'Index.html' and 'Index.syn' of the latest contents that are linked altogether with the received disk version. If found, the CP server transmits the files to the disk device through Internet (S18).

The navigator 14 of the disk device receiving the files interprets the 'Index.html' of the latest version with help of the web browser 12 and resets the system environment for A/V data reproduction as interpreted (S18). The received sync file 'Index.syn' is stored in the storage unit 16 for later use.

If necessary, the navigator 14 checks whether versions of the received files from the CP server are later than those of the files pre-recorded under the root directory, and only if later, it conducts the aforementioned operations, namely, resetting and storing.

As another way, the navigator 14 sends a content version written in the file 'EnDVD.Inf' along with the disk version to the CP server, then the CP server downloads the concerned files only if there are a setup and a sync file related with contents of later version than the received content version.

Afterwards, the navigator 14 checks whether the present mode is 'cookie' (S18-1), and if cookie mode, it requests download of a file having contents of the latest version compatible with the disk version to the CP server and stores entire of the requested file in the storage unit 15 if downloaded from the CP server (S21). The cookie mode may be set, as a reproduction option, by user's selection or from a parameter written a specific file of the I-DVD, e.g., the file 'EnDVD.Inf'.

Because the contents are composed of a html-formatted file, an image file, and/or a sound file as aforementioned, most of them are large size so that their transfer through Internet take relatively long time. Thus, if download of necessary part of the contents is requested a little before it is presented along with A/V data, it may not be presented synchronously with A/V data at a proper time due to unexpected transfer delay on Internet.

The cookie mode is for preventing such cases beforehand. Therefore, in cookie mode, entire of the latest contents or most of requisite contents to be presented synchronously with A/V data are received and stored prior to start of reproduction. In the latter case, remaining contents not stored prior to disk reproduction are received before their synchronous presentation with associated A/V data during I-DVD reproduction by requesting them enough before their individual presentation time.

The navigator 14, in response to a user's input, starts an I-DVD reproduction to read the A/V data written on the I-DVD 10 and to decode out the A/V data to corresponding video/audio signal (S19). During this reproduction, the navigator 14, with reference to time information contained in the received file 'Index.syn' from the CP server, controls synchronous presentation of current video, audio data, and associated part of the contents that have been already downloaded due to the cookie mode (S20).

In the above embodiment, the content-related files are received when an Internet connection is requested from a user. However, the content-related file receiving operation can be conducted automatically without a user's request. In other words, a connection to the CP server is requested referring to URL in the file 'EnDVD.Inf' after completion of the setting step S14, and the download of the content file of the latest version and the content-related files and A/V data reproduction based on them (S17~S21) is conducted if a connection is made within a given interval and the step S16 is conducted if not.

A form of a display window the A/V data is presented in may be specified by the file 'Index.html'. However, it can be set or modified variously according to user's optional selection.

Figure 4:
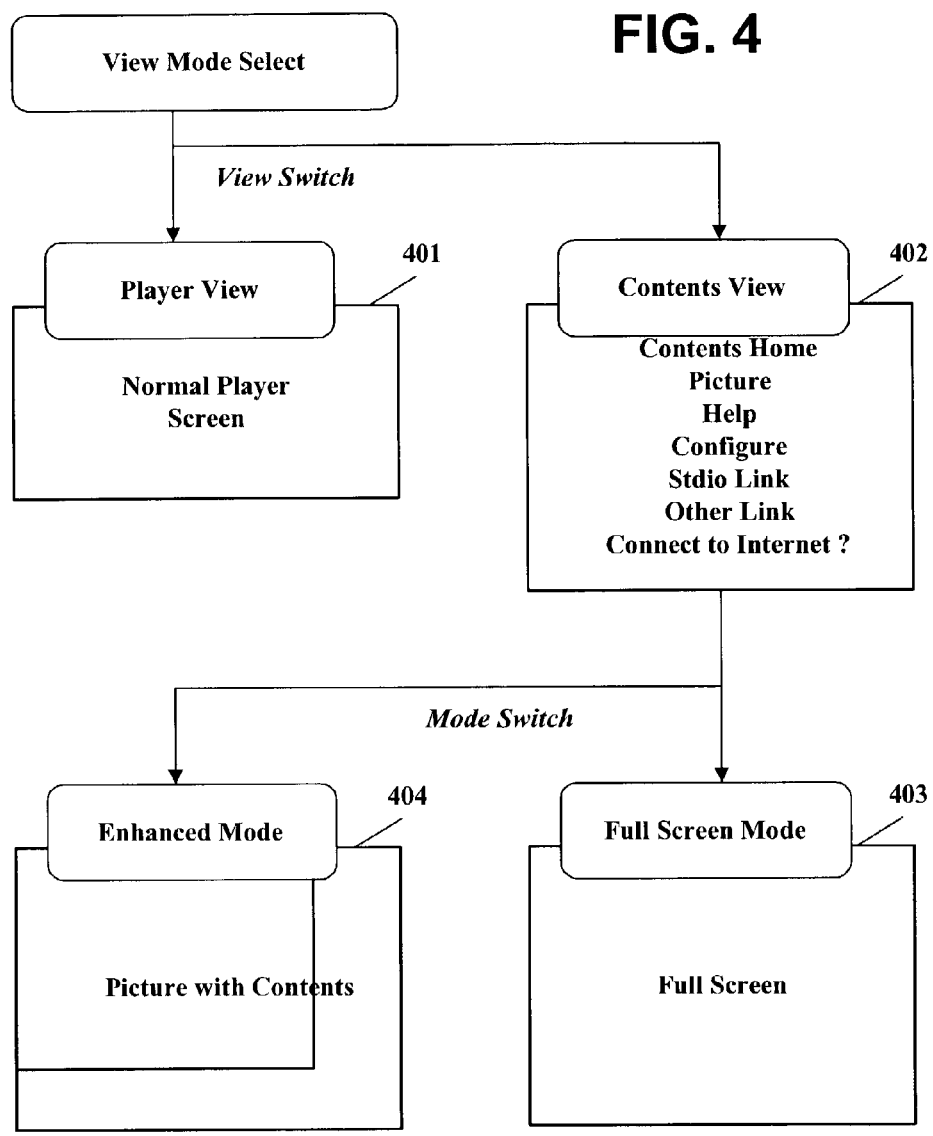
FIG. 4 shows a view mode setting scheme and respective view mode examples.

FIG. 4 shows a view mode setting scheme and respective view mode examples. If a user sets a view mode to 'player view mode' the display window is adjusted to an ordinary screen 401 of a general DVD player, and if sets to 'content view mode' the display window is changed to a menu screen 402 which a user can request an Internet connection through.

If a user sets to 'full screen mode' through configuration of the 'content view mode', the display window is expanded to the full size of a screen 403 to display motion picture reproduced from the I-DVD, and if sets to 'enhanced mode', the display window is partitioned into two zones (404), one zone for displaying motion picture and the other for displaying content information.

The above-explained interactive disk reproducing method using a network enables a user to view the latest contents associated with A/V ROM data recorded on an interactive disk all the times, whereby a user can enjoy the motion picture recorded on the interactive disk much more.

The detailed description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of reproducing an interactive disk using a network, comprising the steps of:
   (a) checking whether a disk placed in a disk device is an interactive disk by determining if the disk includes a file having information of a disk version, a content version, and an address pointing to a content-providing server;
   (b) setting a system to be suitable for a reproduction of contents pre-recorded on the interactive disk, based on a result of the checking step;
   (c) determining whether a download mode is a mode drawn from the group comprising a complete download mode and a streaming download mode;
   (d) receiving, from an external source, a file with contents having a corresponding version, the received file being compatible with the inserted interactive disk and including a setup file and a synchronization file;
   (e) resetting the system to be suitable for a reproduction of the received contents based on the setup file and the synchronization file; and
   (f) according to a result of the determining step (c), and when the received contents include a content part to be presented synchronously with video data, audio data or other data pre-recorded on the interactive disk, presenting the video data, audio data or other data pre-recorded on the interactive disk along with the content part by synchronizing corresponding presentation times with reference to the synchronization file,
   wherein the streaming download mode is a download mode where part of the download data is presented by the step (f) while downloading of the remaining download data continues.

2. The method of claim 1, wherein the setup file is a file for interactive disk reproduction and the synchronization file is a file for synchronizing the received contents with the video data, audio data or other data pre-recorded on the interactive disk.

3. The method of claim 1, wherein the step (d) comprises:
   making a connection to the external source with reference to the address;
   sending the disk version to the external source; and
   receiving the file from the external source if the external source transmits in response to the transmission of disk version.

4. The method of claim 3, wherein the step (f) uses the received file if the version of the content received from the external source is later than the content version of the interactive disk.

5. The method of claim 1, wherein the step (f) presents the video data, audio data or other data pre-recorded on the interactive disk and/or the content part in response to a user's selection.

6. The method of claim 1, wherein the content part comprises an html-formatted file, a sound file, or an image file.

7. An apparatus of reproducing an interactive disk using a network, comprising:
   a controller configured
      to check whether a disk placed in a disk device is an interactive disk by determining if the disk includes a file having information of a disk version, a content version, and an address pointing to a content-providing server;
      to set a system to be suitable for a reproduction of contents pre-recorded on the interactive disk, based on a result of the checking,
      to determine whether a download mode is a mode drawn from the group comprising a complete download mode and a streaming download mode,
      to receive, from an external source, a file with contents having a corresponding version, the received file being compatible with the inserted interactive disk and including a setup file and a synchronization file, and
      to reset the system to be suitable for a reproduction of the received contents based on the setup file and the synchronization file;
   a presentation engine configured to present, when the received contents include a content part to be presented synchronously with video data, audio data or other data pre-recorded on the interactive disk, the video data, audio data or other data pre-recorded on the interactive disk along with the content part by synchronizing corresponding presentation times with reference to the synchronization file,
   wherein the streaming download mode is a download mode where part of the download data is presented by the presentation engine while downloading of the remaining download data continues.

8. The apparatus of claim 7, wherein the setup file is a file for interactive disk reproduction and the synchronization file is a file for synchronizing the received contents with the video data, audio data or other data pre-recorded on the interactive disk.

9. The apparatus of claim 7, wherein the controller is configured to
   make a connection to the external source with reference to the address,
   send the disk version to the external source, and
   receive the file from the external source if the external source transmits in response to the transmission of disk version.

10. The apparatus of claim 9, wherein the presentation engine is configured to use the received file if the version of the content received from the external source is later than the content version of the interactive disk.

11. The apparatus of claim 7, wherein the presentation engine is configured to present the video data, audio data or other data pre-recorded on the interactive disk and/or the content part in response to a user's selection.

12. The apparatus of claim 7, wherein the content part comprises an html-formatted file, a sound file, or an image file.

* * * * *